United States Patent [19]

Breyer et al.

[11] Patent Number: 4,964,221

[45] Date of Patent: Oct. 23, 1990

[54] COUNTERBALANCED COORDINATE-MEASURING INSTRUMENT

[75] Inventors: Karl-Hermann Breyer, Heidenheim; Franz Starp, Wildbad, both of Fed. Rep. of Germany

[73] Assignee: Carl-Zeiss-Stiftung, Heidenheim/Brenz, Oberkochen, Fed. Rep. of Germany

[21] Appl. No.: 367,777

[22] Filed: Jun. 19, 1989

[30] Foreign Application Priority Data

Jul. 7, 1988 [DE] Fed. Rep. of Germany ....... 3823042

[51] Int. Cl.$^5$ .............................................. G01B 5/03
[52] U.S. Cl. ...................................... 33/503; 33/504; 33/1 M
[58] Field of Search ...................... 33/503, 504, 1 M; 172/506; 212/195; 160/189

[56] References Cited

U.S. PATENT DOCUMENTS

| | | | |
|---|---|---|---|
| 1,916,651 | 7/1933 | Beeman et al. | 160/189 |
| 2,742,280 | 4/1956 | Wilcox | 160/189 |
| 2,851,266 | 9/1958 | Klamp | 160/189 |
| 3,818,596 | 6/1974 | Stemple et al. | 33/1 M |
| 3,869,799 | 3/1975 | Meuer et al. | 33/503 |
| 4,351,245 | 9/1982 | Laporte | 248/571 |
| 4,704,821 | 11/1987 | Berndt | 49/446 |
| 4,727,653 | 3/1988 | Fujitani et al. | 33/503 |
| 4,760,622 | 8/1988 | Rohrman | 49/446 |
| 4,835,871 | 6/1989 | Pesikov | 33/503 |

FOREIGN PATENT DOCUMENTS 467992 3/1969 Switzerland .

Primary Examiner—William A. Cuchlinski, Jr.
Assistant Examiner—Alvin Wirthlin
Attorney, Agent, or Firm—Hopgood, Calimafde, Kalil, Blaustein & Judlowe

[57] ABSTRACT

A coordinate-measuring instrument has a purely mechanical device (14) to compensate for the weight of a vertically displaceable spindle (9). The compensation device consists of a helical-coil spring having a working range which is small as compared with its length in relaxed condition, and a belt transmission interposed between the spring and the spindle (9). The belt transmission is preferably developed in the manner of a block and tackle. A first or drive pulley engages and drives the belt for Z-axis positioning of the spindle, and a second or belt-tension pulley applies weight-compensating tension to the belt.

4 Claims, 6 Drawing Sheets

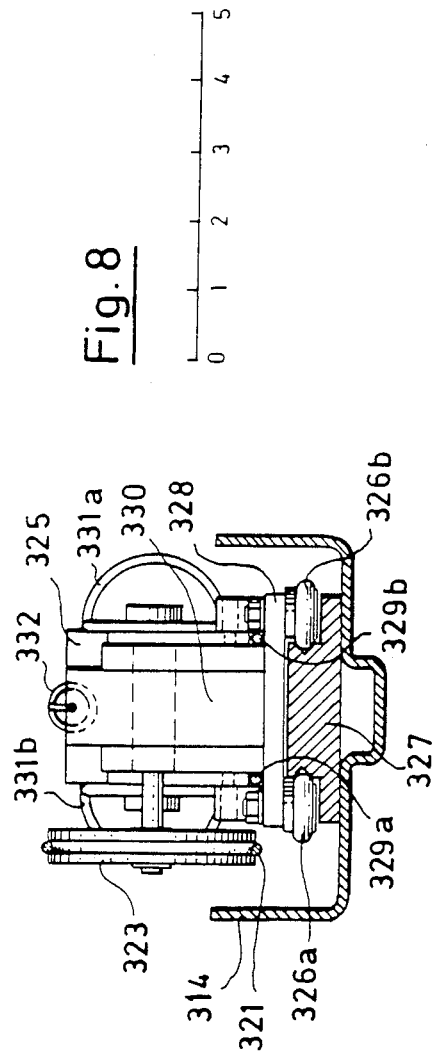
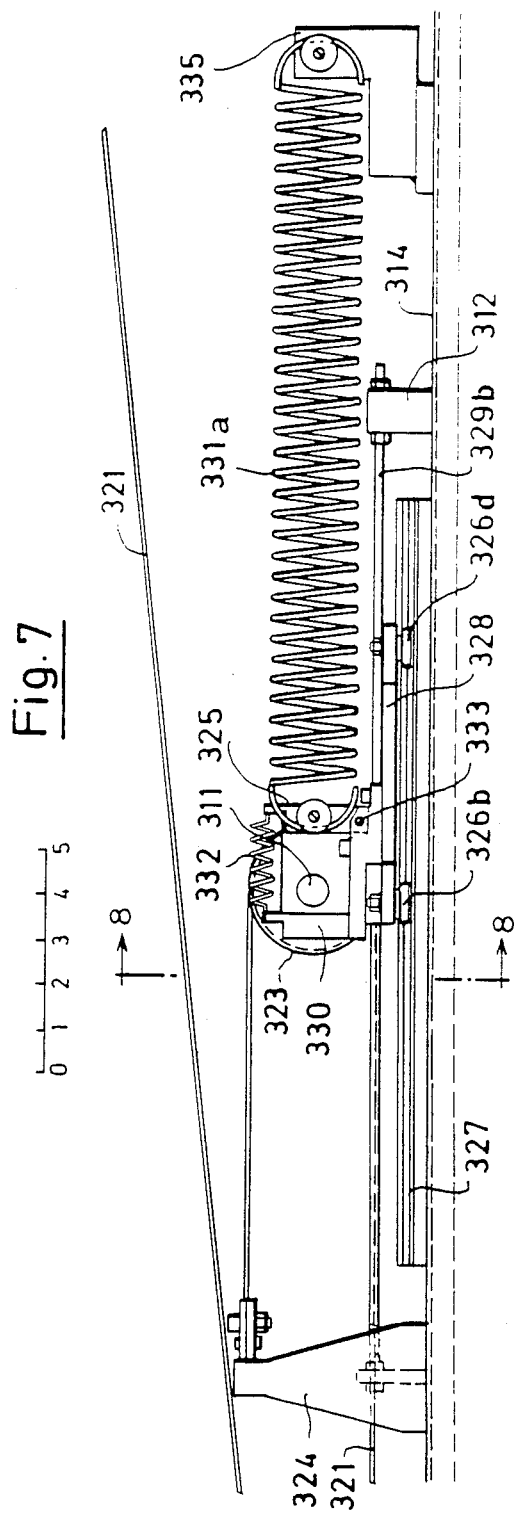

COUNTERBALANCED COORDINATE-MEASURING INSTRUMENT

BACKGROUND OF THE INVENTION

The invention relates to a coordinate-measuring instrument having a vertically guided displaceable measurement slide, a positioning drive for the measurement slide, and a device to compensate for the weight of the measurement slide.

In prior practice, counterweights have been employed to provide weight compensation for the so-called Z-axis of coordinate-measuring instruments, i.e., for the vertically guided measurement slide. Coordinate-measuring instruments with this type of weight compensation are illustratively described in West German Patents Nos. 2,613,451 and 2,943,431. However, counterweights have the disadvantage of doubling the mass of the vertically displaceable part. The machine must therefore be built more rigid in order to reduce to a minimum any deflection to which horizontal guides of the instrument might otherwise be subjected. Furthermore, larger forces are required for accelerating the measurement slide. In addition, a counterweight system dictates a vertical installation, as the only possible construction.

It has also been proposed to provide a pneumatic cylinder for weight compensation, instead of a counterweight. Such coordinate-measuring instruments are described in U.S. Pat. No. 4,207,680, in published West German Unexamined Application No. OS 3,119,228 and in West German Gebrauchsmuster No. 8,609,423. While this solution has the advantage of a smaller mass and permits any desired installed location, it nevertheless requires high construction expense since a pressure-fluid unit, possibly an accumulator for a relatively large amount of air and a pneumatic control circuit, are required in order to maintain constant pressure in the weight-compensation cylinder.

It is furthermore known from U.S. Pat. No. 3,818,596 to effect weight compensation by a coupling which is adjustable with respect to transmitted force and which is arranged between a continuously rotating drive motor and the vertically guided part. In such solutions, the drive motor itself completely assumes the weight of the guided part or even overcompensates for it, and disturbing source of heat is necessarily involved.

It is furthermore known to use a so-called spring motor to compensate for the weight of a vertically displaceable machine part. Such a spring motor uses a spiral spring, wound in the manner of a watch movement. To compensate for the relatively large variation of spring force within the working range of the spring motor, the guided part is, as a rule, coupled to the spring motor by a so-called Archimedes' spiral. This solution is also relatively expensive. Furthermore, such spring motors are not very quiet in operation since non-linear variations in spring force occur within the working range of the spring motor.

BRIEF STATEMENT OF THE INVENTION

It is an object of the present invention to create a device which compensates for the weight of a vertically displaceable slide of a coordinate-measuring instrument and which substantially avoids the above-mentioned disadvantages. In particular, the object is to assure very quiet operation at smallest possible expense.

The invention achieves this object by providing belt suspension for the vertical-axis slide of a measuring machine, wherein an end of the belt is coursed over a drive pulley and over a belt-tensioning pulley, the belt tension being provided by a helical coil spring having a prestressed working range which is small compared with its length in relaxed condition; and spring force is converted to belt tension, via a stepdown belt transmission interposed between the spring and the suspended slide.

The use of a helical coil spring for weight compensation assures very quiet operation of the vertically guided part. And the stepdown transmission makes possible a small working range of the spring, as compared with the length of the spring in relaxed condition; variation of spring force within the working range is thus only slight. In the case of a short displacement range for the vertically guided slide, residual force needed to effect a desired displacement of the slide can therefore be supplied by the vertical-displacement drive motor alone, pursuant to requisite input signals from the position control circuit for the Z-axis. Since energy input is required only for developing these residual forces, the quantity of developed heat is insignificant.

For greater ranges of Z-axis displacement, it is advisable to provide an eccentrically mounted pulley to compensate for spring-force variation within the working range of the spring.

The helical coil spring can be developed either as a compression spring or as a tension spring.

If the weight-compensating helical-coil spring is a compression spring, it is advisedly developed with a tie-rod which extends through the spring. In compressed condition, the spring operates within a working range which is small compared with overall length of the spring, in unstressed condition. This circumstance assures that variation of spring force will be small in relation to the preset value of weight-compensating spring force, and there is a greatly reduced requirement for installation space, as compared with the space requirement for a weight-compensating tension spring; a compact construction is thus achieved with a compression spring. Furthermore, a tightly compressed spring exhibits a much more favorable vibration behavior than a tension spring. Finally, there is no need to provide for security against spring breakage when a compression spring is relied upon for weight compensation, since a broken compression spring merely yields by one turn. A tension spring, on the other hand, has other advantages; for example, it does not require any special measures to assure against lateral bending.

DETAILED DESCRIPTION

Preferred embodiments of the invention will be described in conjunction with the accompanying drawings. In said drawings:

FIG. 7 is another fragmentary side view showing still another modified embodiment of weight-compensation mechanism; and FIG. 8 is a sectional view of the embodiment of FIG. 7, taken at line 8—8 of FIG. 7 and on an enlarged scale.

Figure 1:
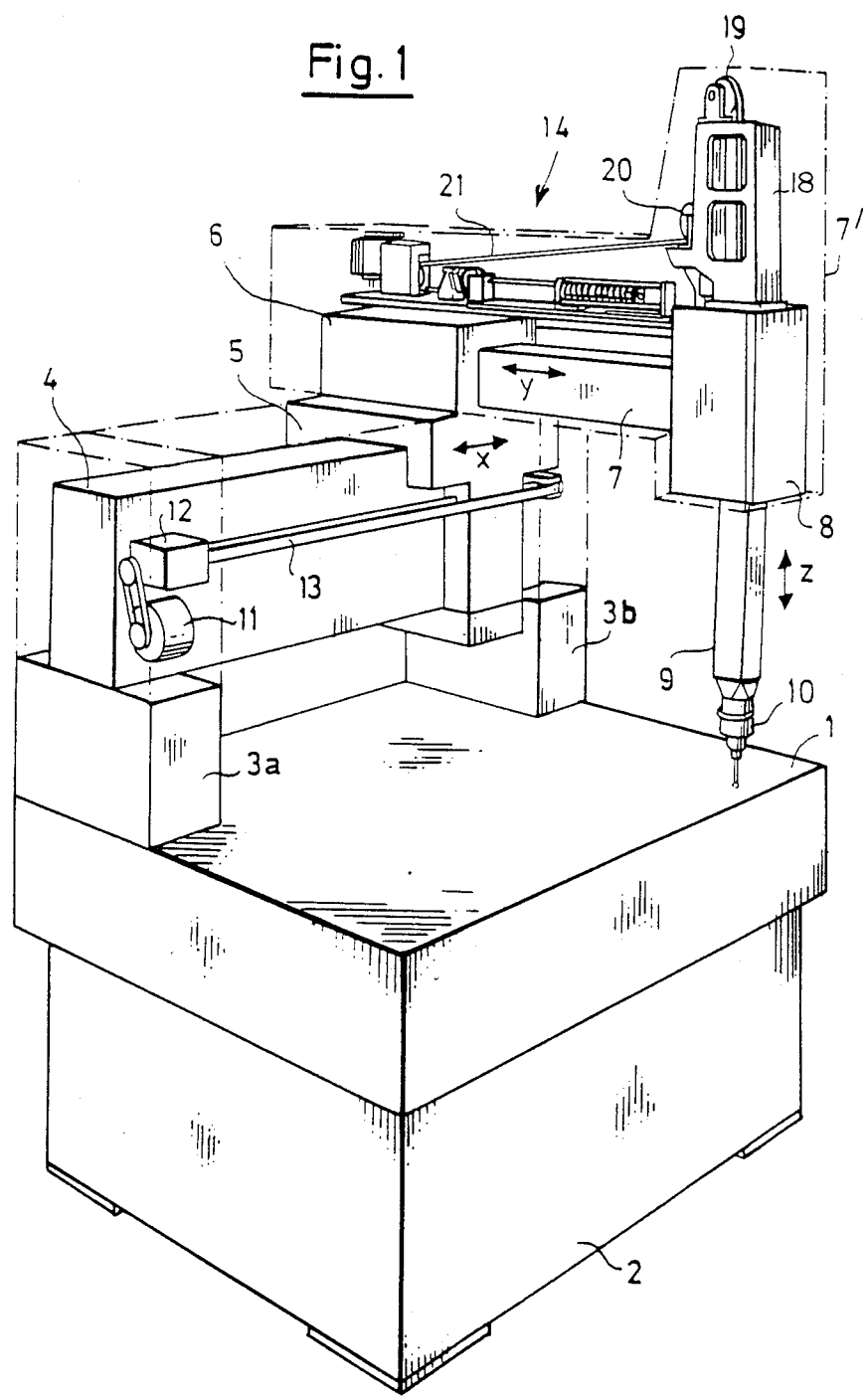
FIG. 1 is a perspective view of a coordinate-measuring instrument of the cantilevered-boom type incorporating a device of the invention, to compensate for the weight of the vertically displaceable spindle.

The coordinate-measuring instrument of FIG. 1 is of the cantilevered-boom type, having a measurement table 1, as of granite, and supported on a base 2. At the rear end of table 1, a guide beam 4 of rectangular cross-section rests horizontally on two supports 3a, 3b, and a measurement slide 5 is displaceable in the X-coordinate direction, being carried on the guide beam by means of air bearings (not shown). The measurement slide 5, in turn, carries a bearing housing 6 for horizontally guided extendable cantilevered support of a boom 7, which is displaceable in the coordinate direction Y, perpendicular to the direction X. The free or outboard end of boom 7 mounts a guide 8 within which a spindle or measurement slide 9 and its probe head 10 are guided for vertical displaceability, in the coordinate direction Z. A phantom outline 7' identifies a protective housing which moves with boom 7 and guide 8, and which substantially encloses Z-axis drive and weight-compensation mechanism to be described.

Each of the displaceable parts of the coordinate-measuring instrument is belt-driven by a separate motor. In the perspective view of FIG. 1, a drive motor 11, a transmission 12, and a belt 13 for X-guidance are visible; the drive for the Y-axis is not shown but will be understood to be of similar construction.

Spindle 9 is gravitationally suspended from a belt 21 which rides two guide pulleys (19, 20) that are mounted to an upstanding support 18 on the top side of the Z-axis guide. The other end of belt 21 is anchored to a pedestal 24, after coursing a fixedly mounted drive pulley 22 and a displaceable pulley 23; pulley 23 is carried at the otherwise free end of a tie-rod 25 which extends through the spring 31 which is used to compensate for the weight of spindle 9. Spring 31 is compressed between a pressure plate 28 fixed to tie-rod 25 and a bracket formation 35 at one end of a spring cage 32 which is mounted to a horizontal support plate 34; plate 34 is secured to guide 8 and is movable therewith in the Y-direction. The pressure plate 28 is shown as a bracket having means 29 of piloted guidance along a guide rail 30, which may be part of cage 32; and means 26 provides similarly piloted rail guidance of a clevis bracket, by which the displaceable pulley 23 is connected to tie-rod 25. Finally, the drive unit is shown to be mounted to the support plate 34 and to comprise an electric motor 17 and a reduction-gear or angle-transmission unit 15; a belt 16 connects motor output to the input shaft of the transmission 15, and drive pulley 22 delivers output torque to the spindle-suspension belt 21.

The coursing of belt 21 around pulleys 22 and 23, with anchorage at pedestal 24 will be seen to define a block-and-tackle configuration, whereby displacement of pressure plate 28, for a given vertical displacement of spindle 9, is reduced by a factor of two. And the spring constant of compression spring 31 is preferably so selected that for the mid-position of spindle 9 in its range of vertical displaceability, the compressional force of spring 31 just compensates for the weight of spindle 9. This being the case, changes in spring force, for spindle positions above or below its mid-position are relatively small, it being noted in reference to FIGS. 4b and 4c that spring 31 operates in a working range a in which spring 31 is always in a compressed state, and the working range is small in comparison with the extent s to which spring 31 is initially compressed.

Figure 4A:
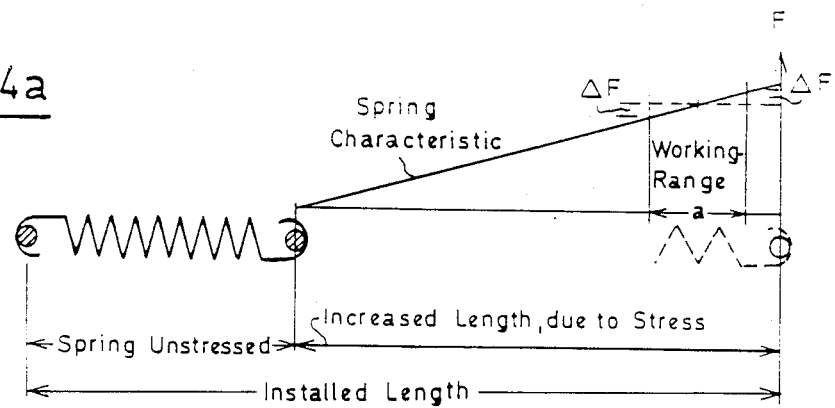
FIG. 4a is a simplified diagram in aid of discussing working range and installed length, for the case of a tension spring for weight compensation.
Figure 4B:
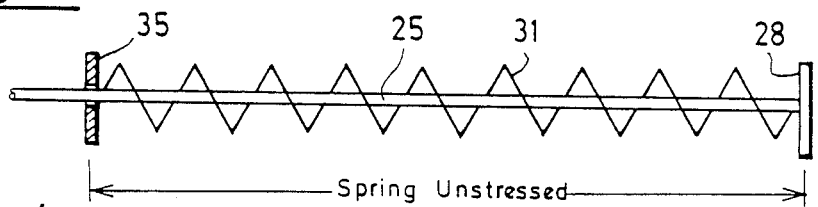
FIGS. 4b and 4c are simplified diagrams in aid of discussing working range and installed length, for the case of a compression spring, respectively showing the relaxed and compressed condition of the spring.
Figure 4C:
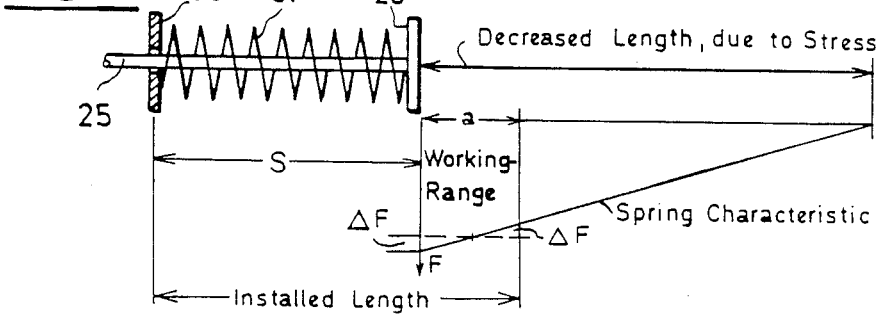

The advantages which a compression spring has over a similar tension spring for weight compensation will be further evident from a comparison of FIG. 4a with FIGS. 4b and 4c. The tension spring shown in FIG. 4a is relatively short in its initial state and is stretched to relatively great length when in the working range; a relatively long installation length is thus required but is frequently not available. The compression spring, on the other hand, is relatively long in its relaxed initial state, but it is compressed to a relatively short length for use in the working range; a short installation length is all that is needed, so that the entire weight-compensation mechanism can be kept very compact and can be arranged above the boom of the coordinate measurement instrument shown in FIG. 1.

As can be seen from like force (F) vs. displacement (a) diagrams in FIGS. 4a and 4c, and with spring tension (FIG. 4a) or spring compression (FIG. 4c) preset to counterbalance the gravitational load of spindle 9 and its probe 10 when in the mid-position of the working range a, the maximum force change from the preset force value is $\Delta F$, for all Z-axis displacements in the working range; this is true whether the spring is prestressed in tension or in compression. And as long as these force changes $\Delta F$ can be realized by the drive system 17, 16, 15 to belt 21, via the block-and-tackle connection 23, 24 to spring 31, there is no need to resort to additional measures, to compensate for force changes of magnitude up to $\Delta F$. Generally speaking, the working range of spindle displacement (Z-axis) is relatively small, and the drive system 17, 16, 15 is more than adequate to provide displacement-drive force within the range $\pm \Delta F$ on the respective sides of the midpoint for which counterbalancing spring force has been preset. Thus, a Z-axis position-control circuit will be understood to automatically effect spindle (9) displacements as required, throughout the working range, and solely through position control of motor 17.

Figure 6:
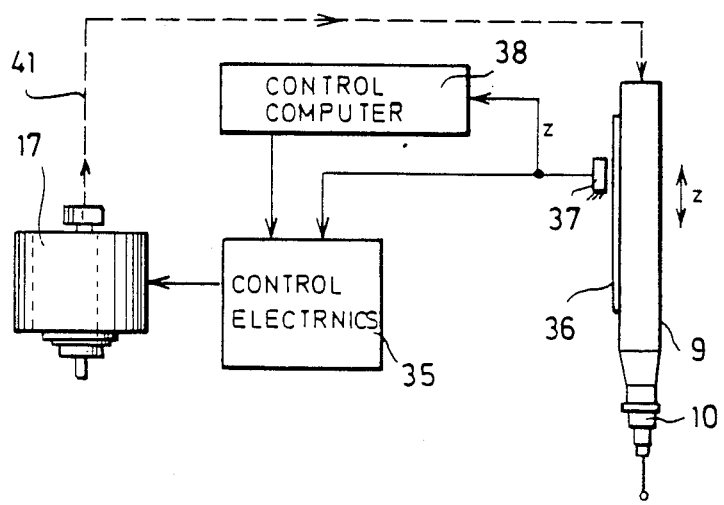
FIG. 6 is an electrical diagram for a position-control circuit for the motor (17) of FIG. 2.

Such a position-control circuit is schematically shown in FIG. 6, wherein the transmission connection between motor 17 and spindle 9 is designated 41. A Z-axis position-measuring system consists of an elongate scale 36 on the spindle itself and a photo-electric scale-reading head 37 in the vertical guide means 8. Its position signals are fed, on the one hand, to the control computer 38 of the coordinate-measuring instrument and, on the other hand, to control electronics 35 for motor 17. The position-control circuit is thus a closed loop, supplying motor 17 continuously with current of magnitude and polarity as required to supply residual forces, i.e., differences between the gravitational weight of the spindle 9 and the preload force of spring 31.

Figure 2:
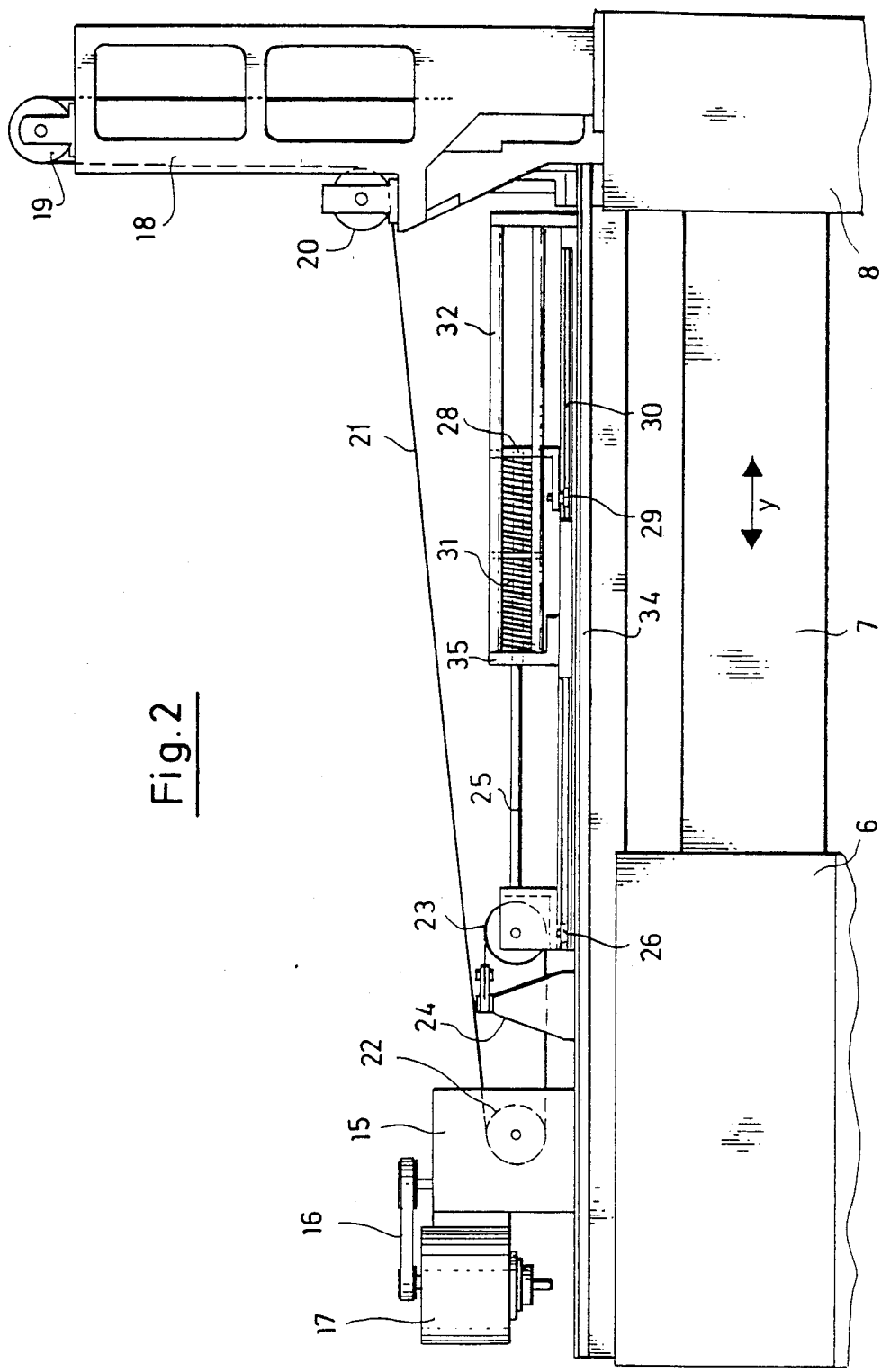
FIG. 2 is an enlarged fragmentary side view, showing the part of the machine containing a first embodiment of motor-operated weight-compensation mechanism.
Figure 3:
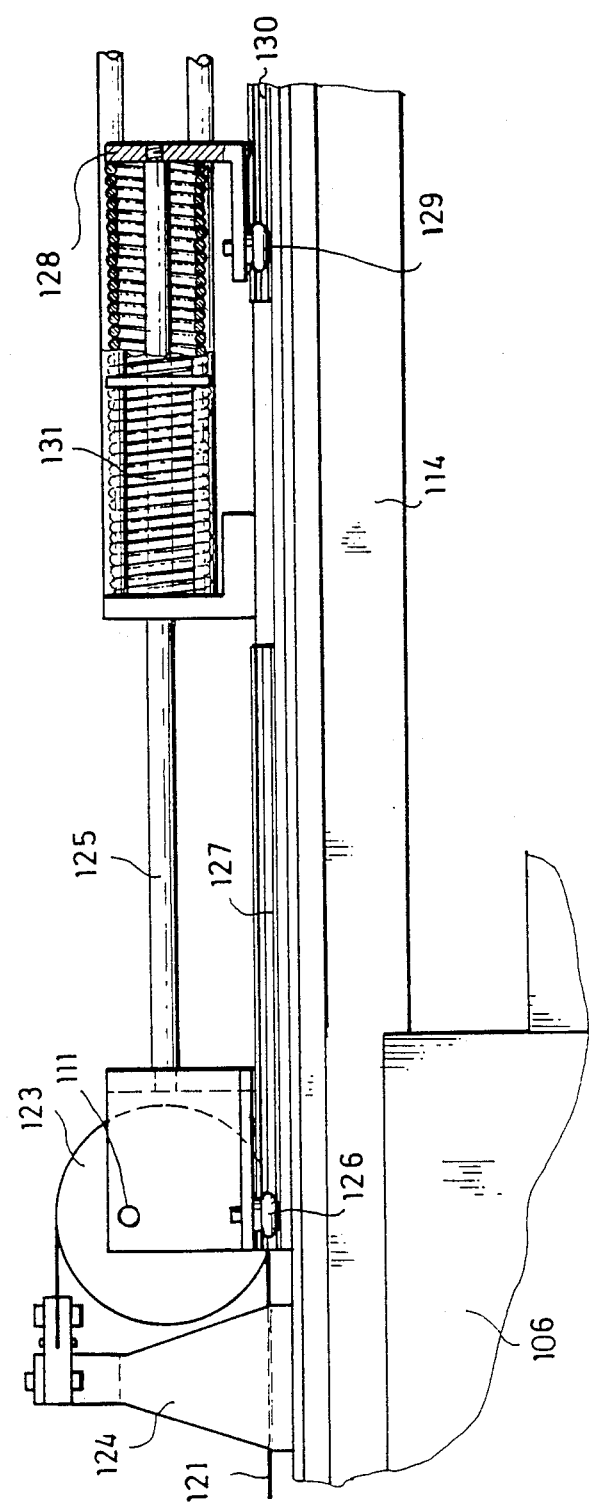
FIG. 3 is a further enlarged side view, showing a slightly modified second embodiment of the weight-compensation mechanism.

If larger Z-axis displacement ranges are to be realized for the spindle, the residual forces $\Delta F$ can also be mechanically compensated, using the modified construction shown in FIG. 3. For the most part, FIG. 3 corresponds essentially to the structure of FIG. 2; corresponding parts have therefore been provided with reference numbers increased by 100 and need not be further described.

In the modification of FIG. 3, the pulley 123 of the block-and-tackle means, to which the tie-rod 125 of compression spring 131 is connected, is mounted to a clevis bracket to rotate eccentrically about its shaft 111, the clevis bracket relies upon a roll 126 for piloted guidance by a rail 127. The mechanical advantage (determined by distance between shaft 111 and the outer circumference of the pulley) thus changes as a function of instantaneous rotary position of pulley 123 and of the instantaneous length of spring 131. In a block-and-tackle transmission as shown, the diameter of pulley 123 does not enter into the reduction ratio, and the result can be obtained, by suitable selection of pulley diameter and eccentricity, that the effective force of spring 131 acting on belt 121 will remain constant throughout the working range.

Figure 5:
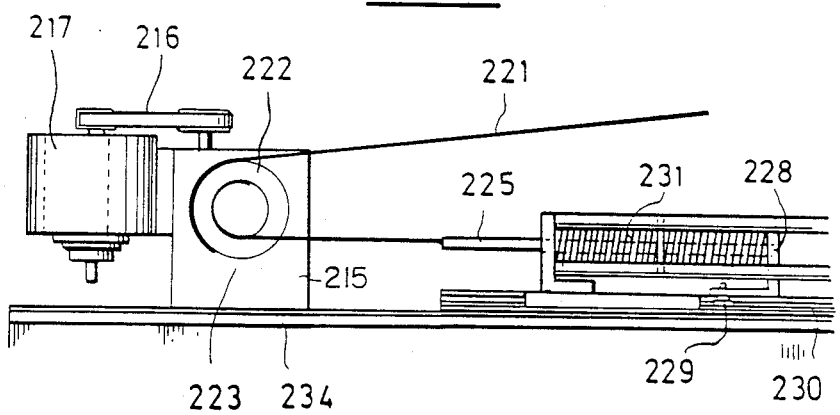
FIG. 5 is a simplified side view of another slightly modified embodiment for weight compensation of the coordinate-measuring instrument.

FIG. 5 shows an alternative embodiment for the mechanically advantaged block-and-tackle transmissions of FIG. 2 and FIG. 3. In FIG. 5, a drive motor 217, via a belt drive 216 and an angle transmission 215, drives a disc 222 of relatively large diameter; the end of the spindle-drive belt 221 is secured to and wrapped around disc 222. The compression spring 231 is similarly connected via a short (oppositely wrapped) belt and tie-rod 225 to a second pulley 223 of smaller diameter; and the two pulleys 223, 222 are keyed to the output shaft of the transmission 215. The parts numbered 228, 229, 230, and 231 in FIG. 5 respectively correspond to those numbered 28, 29, 30, and 31 in FIG. 2.

It will be seen that the force of spindle-weight compensation acting on belt 221 can remain essentially independent of position within the Z-axis working range, whether one adopts the step-down arrangement of pulleys 222, 223 of FIG. 5, or the somewhat helical development of pulley circumference which results from the FIG. 3 eccentric mounting of pulley 123.

In the embodiment of FIGS. 7 and 8, two tension springs 331a, 331b are arranged side-by-side to provide for spindle-weight compensation, in place of a compression spring. As in the case of the other embodiments, the entire weight-compensation structure is mounted to a support 314 on the upper side of the boom 7 of the coordinate-measuring instrument.

In FIG. 7, the anchoring pedestal is designated 324, and the end of a weight-compensating cable 321 is secured to the pedestal. Cable 321 is again arranged in the manner of a block and tackle over a spring-tensing pulley 323 and over a drive pulley (not shown), similar to the drive pulley 22 of FIG. 2. The spring-tensing pulley 323 is mounted for rotation on a shaft 311 in a slide 328 which is mounted, via four guide rolls, for displacement along a guide rail 327, two of these guide rolls (326a and 326b) are seen in FIG. 6, and a third one of these rolls (326d) is additionally seen in FIG. 7.

Slide 328 has a pivoted body part 325 which can swing about a horizontal axis (333) and to which the respective ends of the two springs 331a, 331b are connected. At their ends, these springs are anchored to a pedestal 335 mounted on the support 314; springs 331a, 331b are tensed by the weight of the spindle of the coordinate-measuring instrument, acting via cable 321.

The weight-compensation system of FIGS. 7 and 8 also embodies a safety-brake feature, against possible breakage of the spring; this feature assures that the spindle 9 cannot fall (unbraked) onto the table of the coordinate-measuring instrument or onto the workpiece to be measured. The safety brake consists of two elongate rods 329a, 329b which are anchored to the fixed pedestal 324 and to a second pedestal 312, also fixed to support 314; and the rods 329a, 329b are guided through slide 328, immediately beneath the pivoted part 325. The safety-brake device also includes a second spring 332, having a spring constant which is smaller than that of the two springs 331a, 331b and tensed in the direction to pivot body part 325 about shaft 333, i.e., in the direction toward the pulley-mounting part 330 of slide 328.

In the event that one of the two weight-compensation springs 331a, 331b breaks, then the tension force of the brake spring 332 exceeds that of the remaining weight-compensation spring, and body part 325 is swung, to drive its bottom side, with great mechanical advantage, against the two brake rods 329a, 329b, thereby bringing slide 328 to a standstill.

What is claimed is:

1. A coordinate-measuring instrument having a vertically displaceable measurement slide, a drive for the measurement slide, and a device to compensate for the weight of the measurement slide; the device for weight compensation comprising a helical spring (31) having a working range which is small as compared with its length in relaxed sate, a stepdown belt transmission (21-23) interposed between the spring (31) and the measurement slide (9), the drive (15-17) and the spring (31) being connected to a pulley (22/23) of the belt transmission; means to compensate for variation in spring force within the working range of the spring (31), said means comprising an eccentrically mounted pulley (123) of the belt transmission.

2. A coordinate-measuring instrument having a vertically displacement measurement slide, a drive including an electric motor (17) and control-electronics (35) therefor for displacing said measurement slide, and a device to compensate for the weight of the measurement slide; the device for weight compensation comprising a helical spring (31) having a working range which is small as compared with its length in relaxed state, a stepdown belt transmission (21-23) interposed between the spring (31) and the measurement slide (9), the drive (15-17) and the spring (31) being connected to a pulley (22/23) of the belt transmission; means to compensate for variation in spring force within the working range of the spring (31), said means comprising a feedback-control circuit for spring-counterbalancing control of said control electronics, said feedback-control circuit including an elongate scale on said measurement slide and a fixedly mounted scale-reading device producing a position-indicating electric signal in accordance with displacement of said slide, said feedback-control circuit being a closed loop supplying said control electronics continuously with current to apply a residual force proportional to the difference between gravitational weight of said slide and a preload force of said spring, as a function of the instantaneous position-indicating output of said scale-reading device.

3. In a coordinate-measuring instrument, (i) wherein a spindle is displaceable in a vertical guide above a work-supporting table, said guide being at a fixed elevation above said table, (ii) wherein a vertical-displacement electric-motor drive system and control electronics therefor is connected to determine spindle position in the vertical guide, and (iii) wherein a weight-compensation system is provided to offset the gavitational weight of the spindle and thus to reduce load imposed on the vertical-displacement drive system, the improvement (a) wherein the spindle is suspended by one end of a belt via a pulley carried by the vertical guide, (b) wherein the other end of the belt is fixedly anchored with respect to the vertical guide, (c) wherein a helical-coil spring is fixedly referenced at one end with respect to the vertical guide and has a belt-tension pulley connecting its other end to said belt, the spring being so stressed in application of tension to said belt as to substantially compensate for the suspended gravitational weight of the spindle, (d) wherein said vertical-displacement drive system includes a drive pulley operatively engaged to said belt, and (e) wherein means including a feedback-control circuit is provided for further counter-balancing control of said control electronics; said feedback control circuit including an elongate scale carried with said spindle and a fixedly mounted scale-reading device producing a position-indicating electric signal in accordance with displacement of said slide, said feedback-control circuit being a closed loop supplying said control electronics continuously with current to apply residual force proportional to the difference between gravitational weight of said spindle and a pre-load force of said spring, as a function of the instantaneous position-indicating output of said scale-reading device.

4. In a coordinate-measuring instrument, (i) wherein a horizontal guide provides horizontally displaceable guidance to a cantilevered horizontal boom at a fixed elevation above a work-supporting table, (ii) wherein a spindle is displaceable in a vertical guide at the cantilevered end of said boom, (iii) wherein a vertical-displacement drive system and control electronics therefore is connected to determine spindle position in the vertical guide, and wherein a weight-compensation system is provided to offset the gravitational weight of the spindle and thus to reduce load imposed on the vertical-displacement drive system, the improvement (a) wherein the spindle is suspended by one end of a belt via a pulley carried at the cantilevered end of the boom, (b) wherein the other end of the belt is fixedly anchored at a horizontal location along said boom, (c) wherein a helical-coil spring is horizontally oriented above the boom and is fixedly referenced at one end to a horizontal location along the boom, said coil spring having a belt-tension pulley connecting its other end to said belt; with the spring so tensed in application of tension to said belt as to effectively compensate for the suspended gravitational weight of the spindle, (d) wherein said vertical-displacement drive system is carried by the boom and includes a drive pulley operatively engaged to said belt, and (e) wherein means including a feedback-control circuit is provided for further counterbalancing control of said control electronics; said feedback control circuit including an elongate scale carried with said spindle and a fixedly mounted scale-reading device producing a position-indicating electric signal in accordance with displacement of said spindle, said feedback-control circuit being a closed loop supplying said control electronics continuously with current to apply a residual force proportional to the difference between gravitational weight of said spindle and a preload force of said spring, as a function of the instantaneous position-indicating output of said scale-reading device.

* * * * *